United States Patent
Ryu et al.

(10) Patent No.: US 9,819,494 B2
(45) Date of Patent: Nov. 14, 2017

(54) DIGITAL SIGNATURE SERVICE SYSTEM BASED ON HASH FUNCTION AND METHOD THEREOF

(71) Applicant: MARKANY INC., Seoul (KR)

(72) Inventors: Ho-il Ryu, Seoul (KR); Hae-il Jung, Seoul (KR); Jong-uk Choi, Seoul (KR)

(73) Assignee: MARKANY INC., Seoul (KR)

( * ) Notice: Subject to any disclaimer, the term of this patent is extended or adjusted under 35 U.S.C. 154(b) by 151 days.

(21) Appl. No.: 14/942,686

(22) Filed: Nov. 16, 2015

(65) Prior Publication Data

US 2017/0070350 A1    Mar. 9, 2017

(30) Foreign Application Priority Data

Sep. 3, 2015 (KR) .................. 10-2015-0124575

(51) Int. Cl.
*H04L 9/32* (2006.01)
*H04L 9/00* (2006.01)
*H04L 29/06* (2006.01)

(52) U.S. Cl.
CPC ............ *H04L 9/3247* (2013.01); *H04L 9/006* (2013.01); *H04L 9/3242* (2013.01); *H04L 63/0435* (2013.01); *H04L 63/0442* (2013.01); *H04L 63/0838* (2013.01); *H04L 63/0861* (2013.01); *H04L 63/0869* (2013.01); *H04L 63/0876* (2013.01); *H04L 63/126* (2013.01); *H04L 2209/76* (2013.01)

(58) Field of Classification Search
CPC . H04L 9/3247; H04L 9/3242; H04L 63/0435; H04L 63/0838; H04L 63/0861; H04L 63/0869; H04L 63/0876; H04L 63/126
See application file for complete search history.

(56) References Cited

U.S. PATENT DOCUMENTS

| | | | |
|---|---|---|---|
| 9,270,655 B1* | 2/2016 | Juels | .......................... H04L 9/12 |
| 2002/0184504 A1* | 12/2002 | Hughes | ................. H04L 9/3236 |
| | | | 713/177 |
| 2009/0222674 A1* | 9/2009 | Leichsenring | .......... G06F 21/51 |
| | | | 713/193 |

(Continued)

FOREIGN PATENT DOCUMENTS

| KR | 10-0241349 B1 | 2/2000 |
|---|---|---|
| KR | 1020060050505 A | 6/2007 |
| KR | 101388930 B1 | 4/2014 |

OTHER PUBLICATIONS

Notice of Allowance for corresponding Korean Patent Application No. 1020150124575. (Sep. 8, 2016) (5 pages).

*Primary Examiner* — Kambiz Zand
*Assistant Examiner* — Tongoc Tran
(74) *Attorney, Agent, or Firm* — Lucas & Mercanti, LLP (57) ABSTRACT

Disclosed is a digital signature service system and method based on a hash function in which a main agent, who requires the generation of a digital signature, does not personally generate the digital signature, and wherein digital signatures may be simultaneously and stably generated for large-scale data such as multiple electronic documents and digital data using a hash function and a hash tree, which are known as a simple and secure method, to guarantee the integrity of the data in a digital signature-based structure based on a server.

10 Claims, 4 Drawing Sheets

(56) References Cited

U.S. PATENT DOCUMENTS

| | | | | |
|---|---|---|---|---|
| 2011/0264917 A1* | 10/2011 | Barthelemy | .......... | H04L 9/3255 713/176 |
| 2013/0311772 A1* | 11/2013 | Etheridge | ............. | H04L 9/3247 713/156 |
| 2014/0189359 A1* | 7/2014 | Marien | ................. | H04L 9/3234 713/172 |
| 2015/0052615 A1* | 2/2015 | Gault | ....................... | G06F 21/60 726/26 |
| 2015/0295720 A1* | 10/2015 | Buldas | .................. | H04L 9/3247 713/176 |
| 2016/0063779 A1* | 3/2016 | Libin | ................. | G07C 9/00007 340/5.6 |
| 2016/0077977 A1* | 3/2016 | Narayanamurthy | .. | H04L 9/3242 713/193 |
| 2017/0104598 A1* | 4/2017 | Maximov | ............. | H04L 9/3242 |

\* cited by examiner

FIG. 2

HASH TREE

HASH CHAIN

* HASH CHAIN FOR $X_2$: ( $X_2$; $10_{(2)}$; $X_3$, $X_{0,1}$, $X_{4,7}$ )

FIG. 3

DIGITAL SIGNATURE SERVICE SYSTEM BASED ON HASH FUNCTION AND METHOD THEREOF

CROSS REFERENCE TO RELATED APPLICATION

This application claims the benefit of Korean Patent Application No. 10-2015-0124575, filed Sep. 3, 2015, the content of which is incorporated herein by reference.

BACKGROUND OF THE INVENTION

Field of the Invention

The present invention generally relates to a digital signature service system based on a hash function and a method thereof that may stably perform simultaneous digital signatures for large-scale digital data.

Description of the Related Art

Generally, an electronic document such as a Hangul document, a Word document, a PDF document, and the like, means a document that is written using a computer and is made up of digital information. Unlike conventional documents made of paper, electronic documents may be transmitted in a short time over a data communication network, the Internet, and the like. Accordingly, with the development in communications technology using computers, the use of electronic documents is rapidly increasing.

However, because the electronic document is transmitted in the form of digital signals over a communication network, the security thereof may be weak. Therefore, as one method for improving the reliability of the electronic document, a digital signature may be attached to the document.

Such a digital signature means a seal, a signature, or a cryptographic signature, which is made up of digital information for verifying the identity of the sender of an electronic document, digital data, or a digital message. This may be used to guarantee that the content of the delivered electronic document and digital data has not changed. Therefore, a user attaches a digital signature made up of digital information to an electronic document or digital data rather than directly placing a seal or writing a signature on the document.

Meanwhile, the digital signature may be used for certification of an electronic document or digital data in electronic transactions in which online contracts, electronic seals, etc. are required. Also, recently, the digital signature is actively used as a means for guaranteeing the reliability of electronic transactions, as it is legally recognized.

Also, the digital signature is performed by a signer on electronic documents or in services such as electronic contracts on the web, electronic subscriptions, and the like. In this case, authentication certificates for certifying the digital signature may be used. The authentication certificate is a certificate that is issued by institutions authorized by a country, and confirms the identity of the signer or verifies the digital signature of the signer.

Additional advantages acquired from the use of digital signatures are that the digital signature may be easily transmitted, cannot be repudiated, cannot be copied by others, and a time stamp is automatically maintained. Because the digital signature may be used for any electronic documents and digital data regardless of whether it is encrypted or not, the recipient is guaranteed that the electronic document or the digital data has arrived without falsification and may verify the identity of the sender.

Meanwhile, a conventional digital signature method uses a method in which a user stores a digital signature in a predetermined computer in advance and attaches the stored digital signature to an electronic document when needed. In this case, the seal or signature of the user, which was converted into digital information through a scanning process, may be used as the digital signature.

However, in the case of the conventional digital signature method, because it is necessary to scan the seal or signature of a user to store it in a computer, the process for registering the digital signature is complicated, and because the digital signature is provided through a certain type of network, the qualification of a user allowed to register the digital signature is limited. Also, because the recipient of the electronic document cannot verify the authenticity of the signature attached to the document, there is a disadvantage in that the document has low reliability.

Furthermore, these days, as computer crime techniques become more sophisticated, if electronic documents and/or digital signatures are falsified or forged during the process of transmitting the electronic documents, this cannot be detected. Accordingly, the digital signature may not achieve its original object.

In order to solve the above problem, a digital signature method using a public key-based structure, which is designed using public key encryption, has been used recently. Currently, with the development in information and communication technology and the proliferation of high-speed Internet access, demand for information security is increasing in various fields of society. Therefore, domestic and foreign governments and companies are promoting the distribution of documents that are digitally signed using passwords and digital signatures, which use a public key-based structure.

Meanwhile, the digital signature method using the public key-based structure electronically writes a certain document, and creates a hashed message from the document using specific software. Then, the hash is encrypted using a private key, which has been received in advance from a public-private key generation center. Here, the encrypted hash becomes the digital signature for the message.

However, the conventional digital signature method using the public key-based structure requires a large amount of arithmetic computational resources to support digital signatures based on public keys. Therefore, it is unsuitable for simultaneously generating digital signatures for the large amount of data in an Internet of Things (IoT) environment.

DOCUMENTS OF RELATED ART (Patent Document 1) Korean Patent Application Publication No. 10-0241349.

SUMMARY OF THE INVENTION

Accordingly, the present invention has been made keeping in mind the above problems, and an object of the present invention is to provide a digital signature service system based on a hash function and a method thereof in which a main agent who requires the generation of a digital signature does not personally generate the digital signature and digital signatures are simultaneously and stably generated for large-scale data, such as multiple electronic documents and digital data, using a hash function and a hash tree, which are known as a simple and secure method, to guarantee the integrity of the data in a digital signature-based structure based on a server.

In order to achieve the above object, according to one aspect of the present invention, there is provided a digital signature service system based on a hash function, including: a plurality of digital signature target terminals; an authentication server for comparing previously stored entity authentication information with entity authentication information transmitted from each of the digital signature target terminals, and for generating and encrypting a unique authentication token to be transmitted to a corresponding digital signature target terminal when the previously stored entity authentication information is identical to the entity authentication information transmitted from each of the digital signature target terminals; and a digital signature service provision server for decrypting the unique authentication token, transmitted from each of the digital signature target terminals, by interworking with the authentication server, and for transmitting an authentication approval result to the corresponding digital signature target terminal when the decrypting is successfully performed, wherein each of the digital signature target terminals transmits a hash value of digital signature target data, generated using a predetermined hash function, along with entity identification information to the digital signature service provision server, and wherein the digital signature service provision server is configured to: generate a new hash value by joining the hash value of the digital signature target data and the entity identification information, transmitted from each of the digital signature target terminals; construct a hierarchical hash tree based on the generated new hash value; generate a unique digital signature based on a hash chain of the constructed hash tree; and transmit the unique digital signature to the corresponding digital signature target terminal.

Here, when each of the digital signature target terminals is a user terminal with which a specific user requests a digital signature, the entity authentication information may include at least one piece of unique identification information of the user, selected from among a membership ID and password of the user, a Social Security number, a phone number, biometric information, a One-Time Password (OTP), a Public Key Infrastructure (PKI), and authentication certificate information.

When each of the digital signature target terminals is an electronic device capable of data communication, the entity authentication information may include at least one piece of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

The unique authentication token may be encrypted and decrypted using a symmetric cryptosystem or an asymmetric cryptosystem.

The digital signature service provision server may temporarily store the generated new hash value in a memory queue, and then read the new hash value, temporarily stored in the memory queue, at predetermined time intervals, to be used for construction of the hash tree.

According to another aspect of the present invention, there is provided a method for performing a digital signature service based on a hash value, using a system including a plurality of digital signature target terminals, an authentication server, and a digital signature service provision server, the method including (a) requesting approval of entity authentication by transmitting entity authentication information to the authentication server through each of the digital signature target servers; (b) when the entity authentication information transmitted at step (a) is identical to previously stored entity authentication information as a result of comparison by the authentication server, generating and encrypting a unique authentication token and transmitting the unique authentication token to a corresponding digital signature target terminal; (c) requesting approval of entity authentication by transmitting the unique authentication token, transmitted at step (b), to the digital signature service provision server through each of the digital signature target terminals; (d) decrypting, by the digital signature service provision server, the unique authentication token, transmitted at step (C), by interworking with the authentication server, and transmitting an authentication approval result to the corresponding digital signature target terminal when the decrypting is successfully performed; (e) requesting, by each of the digital signature target terminals, a digital signature by transmitting a hash value of digital signature target data, generated by a predetermined hash value, along with entity identification information to the digital signature service provision server; (f) generating, by the digital signature service provision server, a new hash value by joining the hash value of the digital signature target data and the entity identification information, transmitted at step (e), and then constructing a hierarchical hash tree based on the generated new hash value; and (g) generating, by the digital signature service provision server, a unique digital signature based on a hash chain of the hash tree, constructed at step (f), and transmitting the unique digital signature to the corresponding digital signature target terminal.

Here, when each of the digital signature target terminals is a user terminal with which a specific user requests a digital signature, the entity authentication information may include at least one piece of unique identification information of the user, selected from among a membership ID and password of the user, a Social Security number, a phone number, biometric information, a One-Time Password (OTP), a Public Key Infrastructure (PKI), and authentication certificate information.

When each of the digital signature target terminals is an electronic device capable of data communication, the entity authentication information may include at least one piece of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

In steps (b) and (d), the unique authentication token may be encrypted and decrypted using a synchronous cryptosystem or an asynchronous cryptosystem.

In step (f), the digital signature service provision server may temporarily store the generated new hash value in a memory queue, and then read the new hash value, temporarily stored in the memory queue, at predetermined time intervals, to be used for construction of the hash tree.

According to a further aspect of the present invention, there is provided a computer-readable recording medium on which a program that can execute the above-mentioned digital signature service method based on a hash function is recorded.

The digital signature service method based on a hash function according to the present invention may be implemented as computer-readable code recorded on a computer-readable storage medium. The computer-readable storage medium includes all kinds of storage media in which data that can be interpreted by a computer system are stored.

For example, the computer-readable storage medium may include ROM, RAM, CD-ROM, a magnetic tape, a hard disk, a floppy disk, a portable storage device, flash memory, optical data storage, and the like.

As described above, the digital signature service system based on a hash function and the method thereof according to the present invention have an advantage in that a main agent, who requires the generation of a digital signature, does not personally generate the digital signature, and digital signatures are simultaneously and stably generated for large-scale data, such as multiple electronic documents and digital data, using a hash function and a hash tree, which are known as a simple and secure method, to guarantee the integrity of the data in a digital signature-based structure based on a server.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The above-described objects, features, and advantages are described in detail with reference to the accompanying drawings so that those having ordinary knowledge in the technical field to which the present invention pertains can easily practice the present invention. In the following description of the present invention, detailed descriptions of known functions and configurations which are deemed to make the gist of the present invention obscure will be omitted.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. The terminology used herein is for the purpose of describing particular embodiments only and is not intended to be limiting. As used herein, the singular forms "a," "an" and "the" are intended to include the plural forms as well, unless the context clearly indicates otherwise.

Although general terms being widely used at present were selected as terminology used in the exemplary embodiments while considering the functions of the exemplary embodiments, they may vary according to the intentions of one of ordinary skill in the art, judicial precedents, the advent of new technologies, and the like. Terms arbitrarily selected by the applicant may also be used in a specific case. In this case, their meanings can be obtained based on the detailed description of the exemplary embodiments. Hence, the terms must be defined based on the meanings of the terms and the contents of the entire specification, and not by simply stating the terms themselves.

It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Hereinafter, exemplary embodiments of the present invention will be described in detail. However, the present invention is not limited to the exemplary embodiments disclosed below, but can be implemented in various forms. The following exemplary embodiments are provided in order to enable those of ordinary skill in the art to completely understand the present invention.

Blocks in the accompanying block diagrams, steps in the accompanying flowcharts, and combinations thereof may be performed by program instructions (execution engines). Because these program instructions are stored in processors of general purpose computers, special purpose computers, or other programmable data processing devices, the instructions that are processed by the processor of computers or other programmable data processing devices generate a means for performing functions, described in the blocks of the block diagram and steps of the flowchart. Because these computer program instructions may be stored in a computer for implementing functions in a specific way or computer-usable or computer-readable memory that may support other programmable data processing devices, the instructions stored in the computer-usable or computer-readable memory may produce products containing an instruction execution means for implementing the functions, described in the blocks of the block diagrams and the steps of the flowcharts.

Also, because the computer program instructions may be stored in computers or other programmable data processing devices, a series of operational steps are executed on the computers or other programmable data processing devices so as to generate processes executable by computers, thus the instructions may provide steps for implementing the functions described in the blocks of the block diagrams and the steps of the flowcharts.

Also, each of the blocks or each of the steps may indicate a module, a segment, or a part of code, including one or more executable instructions for specific logical functions, and it should be noted that the functions mentioned in the blocks or steps may be executed in a different order in some alternative embodiments. For example, two successively illustrated blocks or steps may be executed simultaneously in practice. Also, if necessary, the blocks or steps may be executed in reverse order.

Figure 1:
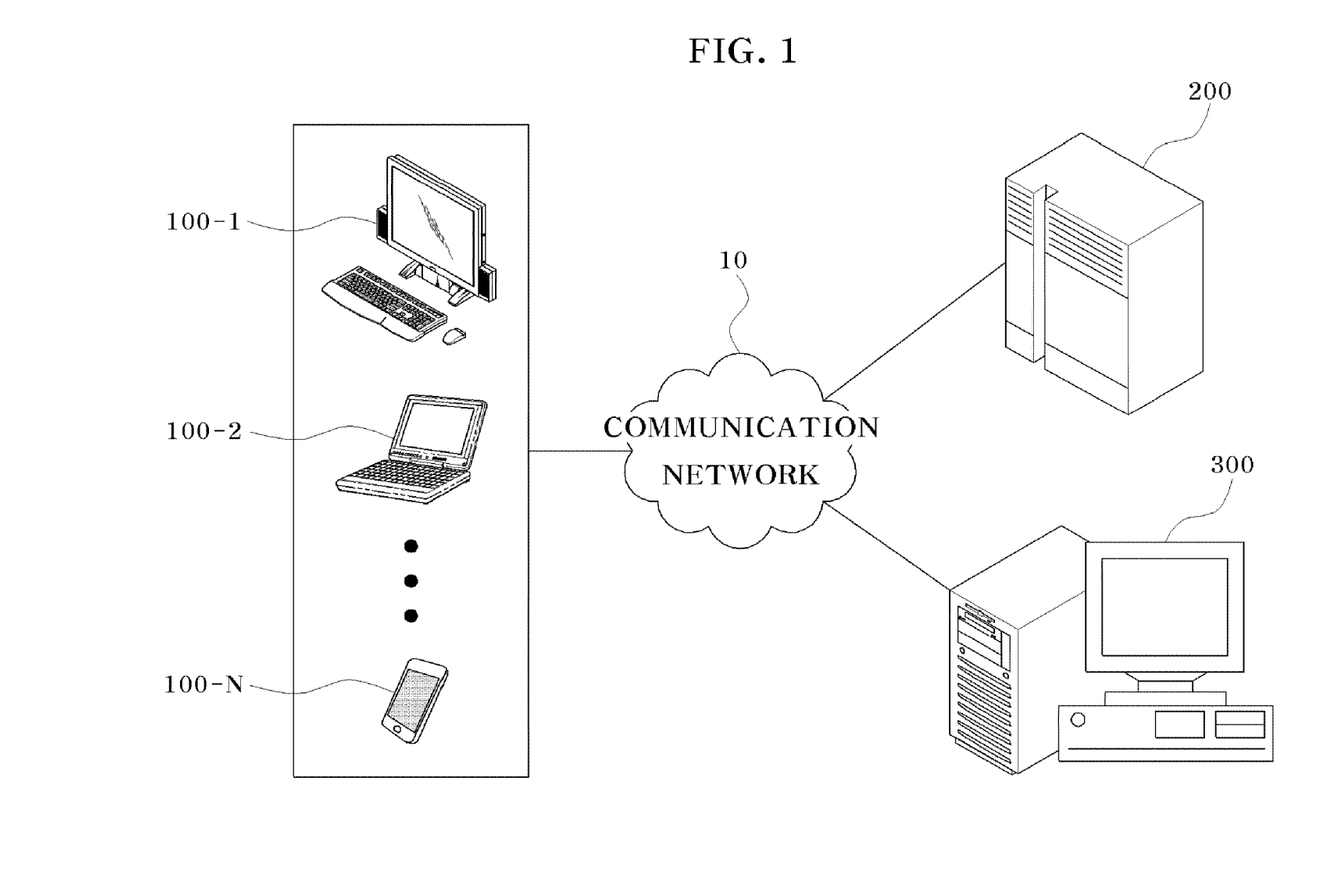
FIG. 1 is an entire block diagram illustrating a digital signature service system based on a hash function according to an embodiment of the present invention.
Figure 2:
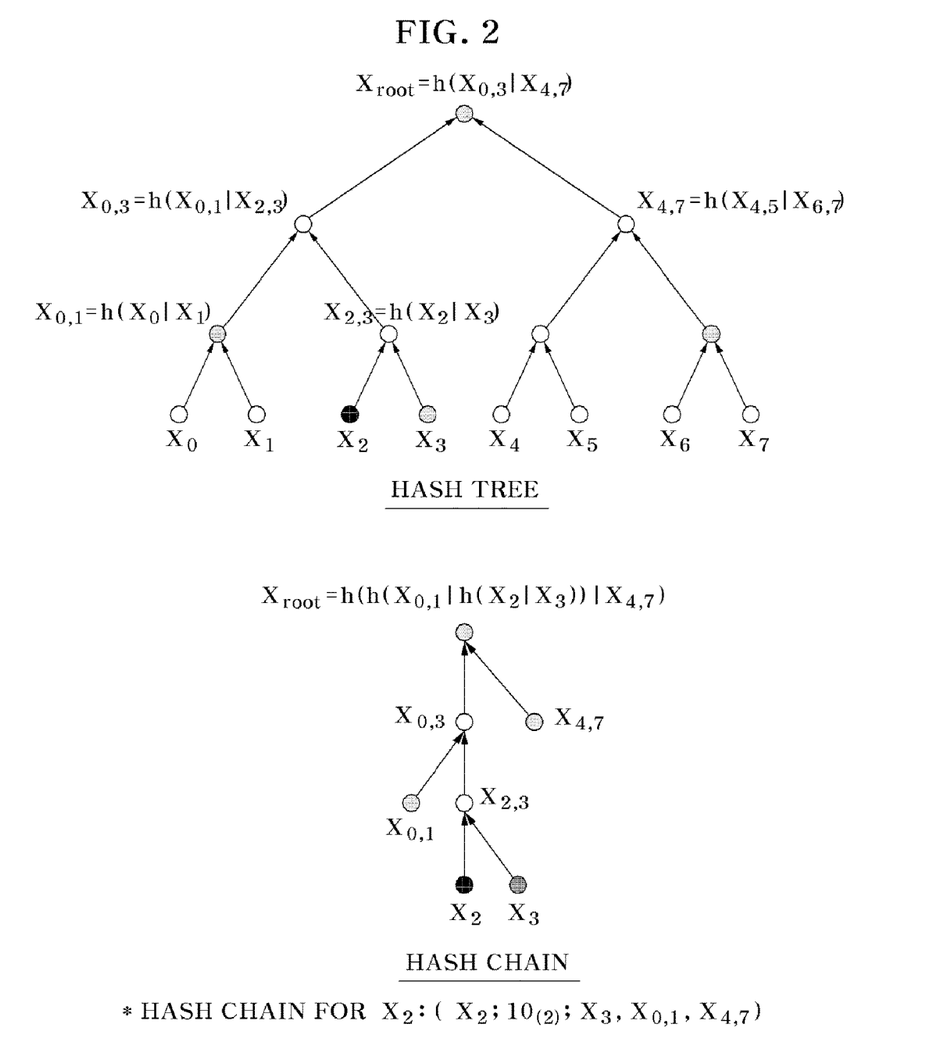
FIG. 2 is a concept diagram for describing a hash tree and hash chain, applied to an embodiment of the present invention.

FIG. 1 is an entire block diagram illustrating a digital signature service system based on a hash function according to an embodiment of the present invention, and FIG. 2 is a concept diagram for describing a hash tree and hash chain, applied to an embodiment of the present invention.

Referring to FIGS. 1 and 2, a digital signature system based on a hash function according to an embodiment of the present invention may be configured to include multiple digital signature target terminals 100-1 to 100-N, an authentication server 200, a digital signature service provision server 300, and the like.

Here, each of the digital signature target terminals 100-1 to 100-N is connected to the authentication server 200 and the digital signature service provision server 300 through a communication network 10. Here, the communication network 10 is a high-speed backbone network of a large-scale communication network, in which high-capacity, long-distance voice and data services are available, and may be a next-generation wireless network including Wi-Fi, Wibro, Wimax, or the like, which provides Internet or high-speed multimedia services.

The Internet means a global open computer network architecture that provides various services based on the TCP/IP protocol and higher levels thereof, namely, Hyper Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), Network Information Service (NIS), and the like. Also, the Internet provides an environment in which each of the digital signature target terminals 100-1 to 100-N can connect to the authentication server 200 and the digital signature service provision server 300. Meanwhile, the Internet may be wired or wireless Internet, and besides, it may be a wired public network, a wireless mobile communication network, or a core network integrated with a mobile Internet.

If the communication network 10 is a mobile communication network, it may be either a synchronous mobile communication network or an asynchronous mobile communication network. As an embodiment of the asynchronous mobile communication network, there is a Wideband Code Division Multiple Access (WCDMA) Network. In this case, although not illustrated in the drawing, the mobile communication network may include, for example, a Radio Network Controller (RNC) and the like. Meanwhile, although the WCDMA network is presented as an example, the mobile communication network may be a next-generation network including a 3G LTE network, a 4G network, a 5G network, and the like, and an IP network based on IP. The communication network 10 serves to deliver signals and data between each of the digital signature target terminals 100-1 to 100-N, the authentication server 300, and the digital signature service provision server 300.

Also, each of the digital signature target terminals 100-1 to 100-N requests the approval of entity authentication by transmitting unique entity authentication information to the authentication server 200, and receives an encrypted unique authentication token from the authentication server 200 when the requested entity authentication is successfully approved.

Also, after receiving the encrypted unique authentication token from the authentication sever 200, each of the digital signature target terminals 100-1 to 100-N requests the digital signature service provision server 300 to approve the entity authentication again, using the encrypted unique authentication token, and receives an entity authentication approval result from the digital signature service provision server 300 when the requested entity authentication is successfully approved.

Also, when it receives the entity authentication approval result from the digital signature service provision server 300, each of the digital signature target terminals 100-1 to 100-N generates a hash value of digital data for which it is intended to acquire a digital signature (hereinafter, referred to as 'digital signature target data') and transmits the generated hash value of the digital signature target data along with unique entity identification information to the digital signature service provision server 300 in order to request the digital signature.

In this case, the hash function is a function for mapping a binary string having an arbitrary length to a binary string having a fixed length, and provides a result by cutting, replacing, and shifting data. Here, this result is called a hash value. The hash function is one of the main functions used for implementing data integrity functions, data authentication, and non-repudiation.

Meanwhile, the unique entity identification information is information for identifying the entity that intends to acquire a digital signature, and it is desirable to comprise security-insensitive information such as information supplementary to the signature. For example, if the entity that intends to receive a digital signature is an electronic device, the unique identification information may include temporary authentication information generated during a previous authentication process (for example, a session key, etc).

Also, each of the digital signature target terminals 100-1 to 100-N receives a generated unique digital signature from the digital signature service provision server 300, and stores it in separate storage (not illustrated) to be managed, in which the unique digital signature is stored in the form of a database so that the digital signature corresponds to the digital signature target data.

Here, each of the digital signature target terminals 100-1 to 100-N may be implemented as two types, that is, a user terminal for requesting a digital signature of an electronic document or digital data (or message) written by a specific user, and an electronic device capable of data communication.

Here, generally, the user terminal is a computer, for example, a Personal Computer (PC), a laptop, etc, but may be all kinds of wired and wireless communication devices without limitation to the above example.

For example, the user terminal includes various mobile terminals that communicate through a wireless Internet or mobile Internet, and additionally may mean all kinds of wired and wireless appliance/communication devices having a user interface for accessing the authentication server 200 and the digital signature service provision server 300, such as Palm PCs, smart phones, mobile play-stations, Digital Multimedia Broadcasting (DMB) phones having a communication function, tablet PCs, iPads, and the like.

Particularly, when the user terminal is implemented as a common smart phone, the smart phone may be understood as a phone based on an open operating system in which a user may download various desired applications and freely use or delete the applications, unlike a feature phone. Also, it may be all mobile phones having a mobile office function in addition to generally used voice/video call functions, an Internet data communication function, and the like, or communication devices including all Internet phones and tablet PCs that do not have a voice call function but may access the Internet.

The above-mentioned smart phones may be implemented as a smart phone in which various open operating systems are installed, and the open operating systems may be, for example, Nokia Symbian OS, BlackBerry OS, Apple iOS, Microsoft Windows Mobile, Google Android, Samsung Bada OS, and the like.

As described above, because the smart phones use open operating systems, unlike a mobile phone having a closed OS, a user may freely install and manage various application programs.

Also, the smart phone basically includes a control unit, a memory unit, a display unit, a key input unit, a sound output unit, a sound input unit, a camera unit, a wireless communication module, a near field communication module, a battery for providing power, and the like.

Meanwhile, electronic devices capable of data communication may indicate electronic devices capable of all kinds of wired and wireless data communication, which intend to acquire digital signatures and may output digital data. For example, they may comprise objects for simultaneous large-scale digital signatures (for example, CCTV cameras for surveillance use, smart phones, PCs, cars, refrigerators, washing machines, clocks, and the like) in an Internet of Things (IoT) environment.

If each of the digital signature target terminals 100-1 to 100-N is a user terminal with which a specific user requests a digital signature, it is desirable that the entity authentication information include at least one piece of unique user identification information, selected from among a membership ID and password of the user, a Social Security number, a phone number, biometric information, a One-Time Password (OTP), a Public Key Infrastructure (PKI), and authentication certificate information, but may include any unique identification information capable of identifying the specific user without limitation to the above examples.

In this case, the biometric information is an unforgeable factor and may be, for example, a fingerprint, iris, face, blood vessel, glottis, signature, voice, retina, flexion crease, and the like. Either the fingerprint or iris may be registered as biometric information. According to need, various factors may be registered as biometric information.

Meanwhile, if each of the digital signature target terminals 100-1 to 100-N is an electronic device capable of data communication, it is desirable that the entity authentication information include at least one piece of unique device identification information, selected from among the name of the device, the password of the device, the serial number of the device, the kind of the device, the manufacturer of the device, the Media Access Control (MAC) address of the device, the unique Internet Protocol (IP) address of the device, the model of the device, the secret key of the device, and the authentication information of the device, generated by a private key based on a PKI, but may include any device identification information capable of identifying the device without limitation to the above examples.

The authentication server 200 is connected to each of the digital signature target terminals 100-1 to 100-N and the digital signature service provision server 300 through the communication network 10. The authentication server 200 receives unique entity authentication information, transmitted from each of the digital signature target terminals 100-1 to 100-N, and compares it with unique entity authentication information that was previously stored in a separate database. If the transmitted entity identification information is identical to the stored unique entity identification information, the authentication server 200 generates a unique authentication token through encryption, and transmits it to a corresponding digital signature target terminal 100-1 to 100-N.

Also, the authentication server 200 interworks with the digital signature service provision server 300 and shares encryption and decryption keys for the encrypted authentication token in order to encrypt and decrypt the authentication token.

In this case, the unique authentication token is electronic information, and is acquired by encrypting the entity authentication, to be transmitted to the digital signature service provision server 300, by the authentication server 200 in order to indicate that each of the digital signature target terminals 100-1 to 100-N, which intends to use the digital signature service, is a normally registered digital signature target terminal.

This unique authentication token may be encrypted and decrypted through a symmetric cryptosystem using a symmetric key or an asymmetric cryptosystem using an asymmetric key.

Also, the digital signature service provision server 300 is connected to each of the digital signature target terminals 100-1 to 100-N and the authentication server 200 through the communication network 10, and is a server for simultaneously generating and providing digital signatures for large-scale data such as multiple electronic documents and digital data to guarantee the integrity thereof. Interworking with the authentication server 200, the digital signature service provision server 300 serves to decrypt the unique authentication token transmitted from the digital signature target terminals 100-1 to 100-N.

Also, when the unique authentication token, transmitted from the digital signature target terminals 100-1 to 100-N, is successfully decrypted, the digital signature service provision server 300 transmits the authentication approval result to the corresponding digital signature target terminal 100-1 to 100-N.

Also, the digital signature service provision server 300 generates a new hash value by joining the hash value of the digital signature target data, transmitted from each of the digital signature target terminals 100-1 to 100-N, with entity identification information, and constructs a hierarchical hash tree based on the generated new hash value.

Also, the digital signature service provision server 300 generates a unique digital signature based on the hash chain of the constructed hash tree, and transmits it to the corresponding digital signature target terminal 100-1 to 100-N that requested the digital signature.

Also, the digital signature service provision server 300 temporarily stores the generated new hash value in the memory queue, and reads the new hash value, temporarily stored in the memory queue, at predetermined time intervals to be used for the construction of the hash tree.

Meanwhile, it is desirable for the digital signature service provision server 300 to construct the hash tree by reading the new hash value, temporarily stored in the memory queue, at predetermined time intervals, but, without limitation thereto, the hash tree may be constructed by sequentially reading the new hash value according to the order stored in the memory queue based on the predetermined amount of data or predetermined number of pieces of data.

Meanwhile, the hash tree means a tree consisting of hash values. In the hash tree, each leaf node indicates a value acquired by hashing a data block, and an intermediate node of the tree has one or more child nodes.

Therefore, the intermediate node of the tree has a hash value that combines the hash values of the child nodes. The root node has a hash value that represents the data block of all the child nodes.

It is desirable to use a Merkle hash tree structure for the hash tree, and this structure is effective in verifying the integrity of data, divided into multiple blocks. Also, it is possible to verify the integrity of large-scale data by suitably adjusting the height of the hash tree.

As illustrated in FIG. 2, the values constituting the hash tree are values of nodes $X_0$, $X_1$, $X_2$, $X_3$, $X_4$, $X_5$, $X_6$, and $X_7$, and in order to generate a final value, that is, $X_{root}$, only a specific node value is required.

Here, the specific node value for generating $X_{root}$ may be represented as a hash chain. A unique hash chain for specific data, the integrity of which must be verified, may be generated, and the integrity may be verified by generating the value of $X_{root}$ using the data and the hash chain value. In other words, if the final $X_{root}$ is known, integrity verification is possible by hashing data $X_0$ to $X_7$.

For example, the hash chain for $X_2$ is represented as "$X_2$; $10_{(2)}$; $X_3$, $X_{0,1}$, $X_{4,7}$". Here, "$10_{(2)}$" denotes the number 2, expressed in binary notation.

According to the structure of the hash tree, a unique data value may be generated using the characteristic of the hash tree without the use of keys, and only a linear hash operation may be performed, without the need for algebraic operations. Also, a hash chain for a large amount of data may be generated through the construction of a large-scale hash tree.

Meanwhile, in FIG. 2, "h" denotes a hash function, "$X_i$" denotes the i-th leaf node, "$X_{i,j}$" denotes a node including the i-th leaf node to the j-th leaf node, and "|" denotes a bit string concatenation operator.

Hereinafter, a digital signature service method based on a hash function according to an embodiment of the present invention will be described in detail.

Figure 3:
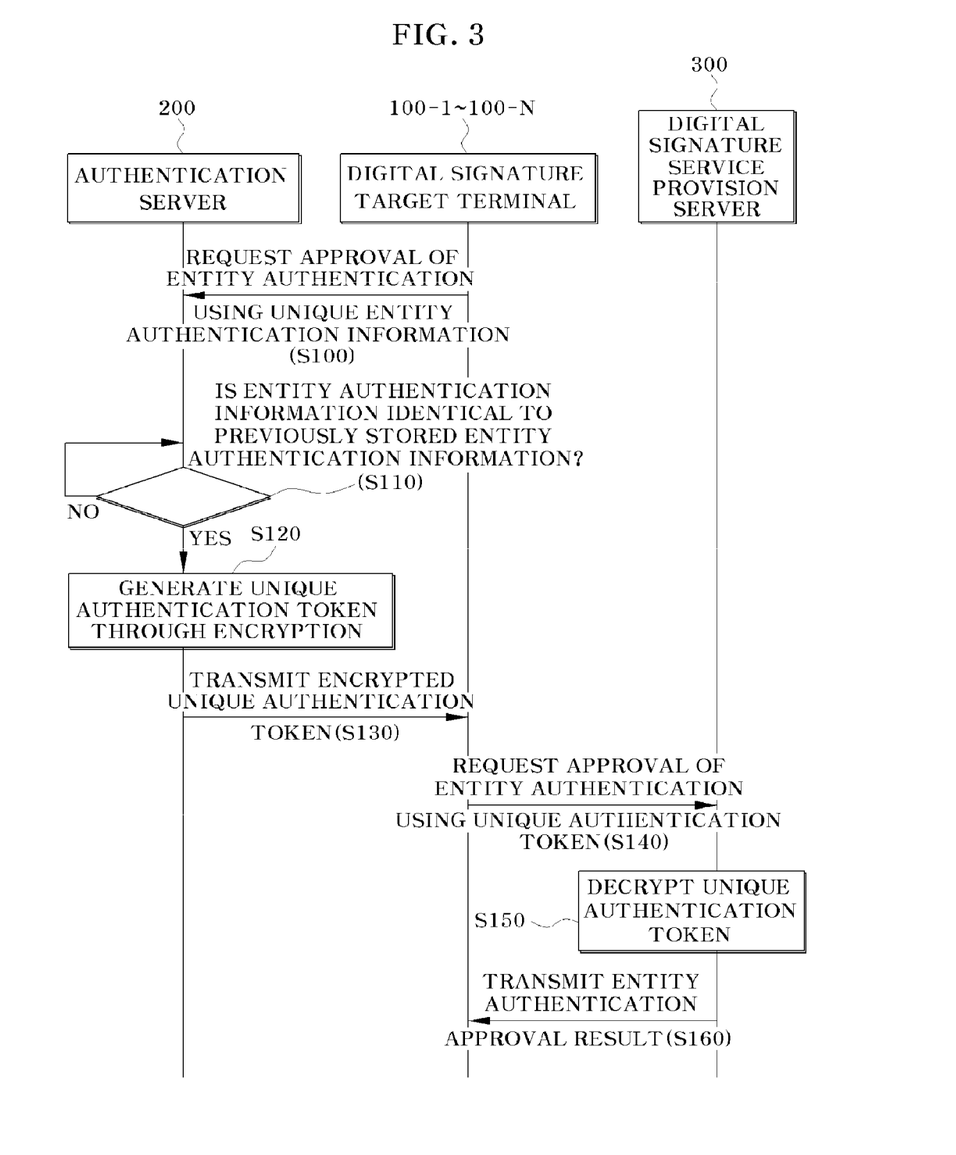
FIG. 3 is a flowchart describing the entity authentication process of a digital signature service method based on a hash function according to an embodiment of the present invention.
Figure 4:
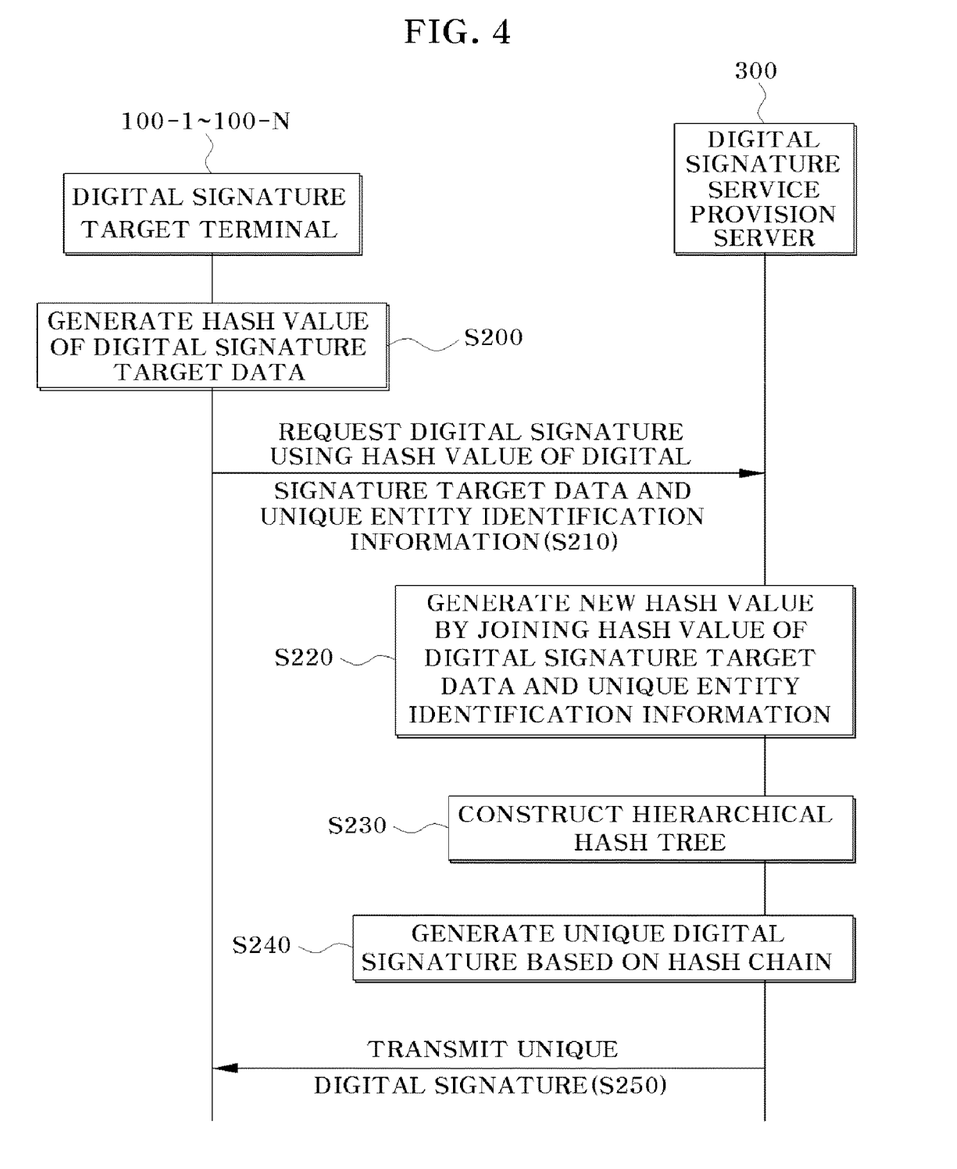
FIG. 4 is a flowchart describing the digital signature generation process of a digital signature service method based on a hash function according to an embodiment of the present invention.

FIG. 3 is a flowchart illustrating the entity authentication process of the digital signature service method based on a hash function according to an embodiment of the present invention, and FIG. 4 is a flow chart illustrating the digital signature generation process of the digital signature service method based on a hash function according to an embodiment of the present invention.

Referring to FIGS. 3 and 4, the digital signature service method based on a hash function according to an embodiment of the present invention must perform an entity authentication process for the entity that intends to acquire a digital signature, before the acquisition of a unique digital signature for the digital signature target data.

In other words, as illustrated in FIG. 3, each of the digital signature target terminals 100-1 to 100-N requests the approval of entity authentication by transmitting unique entity authentication information to the authentication server 200 at step S100.

In this case, if each of the digital signature target terminals 100-1 to 100-N is a user terminal with which a specific user requests a digital signature, it is desirable that the unique entity authentication information include at least one piece of unique user identification information, selected from among a membership ID and password of the user, a Social Security number, a phone number, biometric information, a One-Time Password (OTP), a Public Key Infrastructure (PKI), and authentication certificate information.

Meanwhile, if each of the digital signature target terminals 100-1 to 100-N is an electronic device capable of data communication, it is desirable that the unique entity authentication information include at least one piece of unique device identification information, selected from among the name of the device, the password of the device, the serial number of the device, the kind of the device, the manufacturer of the device, the Media Access Control (MAC) address of the device, the unique Internet Protocol (IP) address of the device, the model and version of the device, the secret key of the device, and authentication information of the device, which is generated by a private key based on a PKI.

Subsequently, the authentication server 200 compares the unique entity authentication information, transmitted at step S100, with unique entity authentication information, previously stored in a separate database, and determines whether they are the same at step S110.

As a result of step S110, if the unique entity authentication information transmitted at step S100 is identical to the unique entity authentication information previously stored in the separate database, a unique authentication token for the unique entity authentication information is generated through encryption as an entity authentication approval result at step S120, and, at step S130, the unique authentication token generated at step S120 is transmitted to the corresponding digital signature target terminal 100-1 to 100-N that requested the approval of the entity authentication.

Then, each of the digital signature target terminals 100-1 to 100-N transmits the unique authentication token, transmitted at step S130, to the digital signature service provision server 300 to request the approval of the entity authentication at step S140.

Subsequently, the digital signature service provision server 300 decrypts the unique authentication token, transmitted at step S140, by interworking with the authentication server 200, at step S150. When the decryption is successfully performed, the digital signature service provision server 300 transmits the entity authentication approval result to the corresponding digital signature authentication terminal 100-1 to 100-N at step S160, whereby the entity authentication approval is completed.

Meanwhile, it is desirable that the unique authentication token is encrypted and decrypted through a symmetric cryptosystem using a symmetric key or an asymmetric cryptosystem using an asymmetric key.

As described above, when the entity authentication process, which is the preprocessing process for receiving the digital signature, has completed, a process for generating a digital signature is performed.

As illustrated in FIG. 4, each of the digital signature target terminals 100-1 to 100-N, for which it is intended to acquire a digital signature, generates a hash value for the digital signature target data using a predetermined hash function at step S200.

Subsequently, each of the digital signature target terminals 100-1 to 100-N requests a digital signature by transmitting the hash value of the digital signature target data, generated at step S200, along with entity identification information to the digital signature service provision server 300 at step S210.

Then, the digital signature service provision server 300 generates a new hash value at step S220 by joining the hash value of the digital signature target data and the entity identification information, transmitted at step S210.

Then, the digital signature service provision server 300 constructs a hierarchical hash tree at step S230 based on the new hash value, generated at step S220.

In this case, at step S230, the digital signature service provision server 300 may temporarily store the new hash value, generated at step S220, in the memory queue, and then may read the new hash value, temporarily stored in the memory queue, at predetermined time intervals for use in constructing the hash tree.

Then, the digital signature service provision server 300 generates a unique digital signature at step S240 based on the hash chain of the hash tree, constructed at step S230, and, at step S250, transmits the digital signature, generated at step S240, to the corresponding digital signature target terminal 100-1 to 100-N that requested the digital signature.

Meanwhile, a digital signature service method based on a hash function according to an embodiment of the present invention may be implemented as computer-readable code recorded on a computer-readable storage medium. The computer-readable storage medium includes all kinds of storage media in which data that can be interpreted by a computer system are stored. For example, the computer-readable storage medium may include ROM, RAM, CD-ROM, a magnetic tape, a hard disk, a floppy disk, a portable storage device, flash memory, optical data storage, and the like.

Also, the computer-readable storage medium may be distributed in a computer system connected by a computer network, and may be stored and executed as code that can be read using a distributed method.

As described above, the digital signature service system based on a hash function and the method thereof according to the present invention has an advantage in that the main agent who requires the generation of a digital signature does not personally generate the digital signature, and digital signatures are simultaneously and stably generated for large-scale data such as multiple electronic documents and digital data, using a hash function and a hash tree, which are known as a simple and secure method, to guarantee the integrity of the data in a digital signature-based structure based on a server.

Although a preferred embodiment of the digital signature service system and method according to the present invention has been described for illustrative purposes, those skilled in the art will appreciate that various modifications, additions and substitutions are possible, without departing from the scope and spirit of the invention as disclosed in the accompanying claims.

What is claimed is:

1. A digital signature service system based on a hash function, comprising:
   a plurality of digital signature target terminals;
   an authentication server for comparing previously stored entity authentication information with entity authentication information transmitted from each of the digital signature target terminals, and for generating and encrypting a unique authentication token to be transmitted to a corresponding digital signature target terminal when the previously stored entity authentication information is identical to the entity authentication information transmitted from each of the digital signature target terminals; and
   a digital signature service provision server for decrypting the unique authentication token, transmitted from each of the digital signature target terminals, by interworking with the authentication server, and for transmitting an authentication approval result to the corresponding digital signature target terminal when the decrypting is successfully performed,
   wherein each of the digital signature target terminals transmits a hash value of digital signature target data, generated using a predetermined hash function, along with entity identification information to the digital signature service provision server, and
   the digital signature service provision server is configured to: generate a new hash value by joining the hash value of the digital signature target data and the entity identification information, transmitted from each of the digital signature target terminals; construct a hierarchical hash tree based on the generated new hash value; generate a unique digital signature based on a hash chain of the constructed hash tree; and transmit the unique digital signature to the corresponding digital signature target terminal.

2. The digital signature service system of claim 1, wherein when each of the digital signature target terminals is a user terminal with which a specific user requests a digital signature,
   the entity authentication information includes at least one piece of unique identification information of the user, selected from among a membership ID and password of the user, a Social Security number, a phone number, biometric information, a One-Time Password (OTP), a Public Key Infrastructure (PKI), and authentication certificate information.

3. The digital signature service system of claim 1, wherein when each of the digital signature target terminals is an electronic device capable of data communication,
   the entity authentication information includes at least one piece of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

4. The digital signature service system of claim 1, wherein the unique authentication token is encrypted and decrypted using a symmetric cryptosystem or an asymmetric cryptosystem.

5. The digital signature service system of claim 1, wherein the digital signature service provision server temporarily stores the generated new hash value in a memory queue, and then reads the new hash value, temporarily stored in the memory queue, at predetermined time intervals, to be used for construction of the hash tree.

6. A method for performing a digital signature service based on a hash value, using a system including a plurality of digital signature target terminals, an authentication server, and a digital signature service provision server, the method comprising:
   (a) requesting approval of entity authentication by transmitting entity authentication information to the authentication server through each of the digital signature target servers;
   (b) when the entity authentication information transmitted at step (a) is identical to previously stored entity authentication information as a result of comparison by the authentication server, generating and encrypting a unique authentication token and transmitting the unique authentication token to a corresponding digital signature target terminal;
   (c) requesting approval of entity authentication by transmitting the unique authentication token, transmitted at step (b), to the digital signature service provision server through each of the digital signature target terminals;
   (d) decrypting, by the digital signature service provision server, the unique authentication token, transmitted at step (C), by interworking with the authentication server, and transmitting an authentication approval result to the corresponding digital signature target terminal when the decrypting is successfully performed;
   (e) requesting, by each of the digital signature target terminals, a digital signature by transmitting a hash value of digital signature target data, generated by a predetermined hash value, along with entity identification information to the digital signature service provision server;

(f) generating, by the digital signature service provision server, a new hash value by joining the hash value of the digital signature target data and the entity identification information, transmitted at step (e), and then constructing a hierarchical hash tree based on the generated new hash value; and (g) generating, by the digital signature service provision server, a unique digital signature based on a hash chain of the hash tree, constructed at step (f), and transmitting the unique digital signature to the corresponding digital signature target terminal.

7. The method of claim 6, wherein when each of the digital signature target terminals is a user terminal with which a specific user requests a digital signature, the entity authentication information includes at least one piece of unique identification information of the user, selected from among a membership ID and password of the user, a Social Security number, a phone number, biometric information, a One-Time Password (OTP), a Public Key Infrastructure (PKI), and authentication certificate information.

8. The method of claim 6, wherein when each of the digital signature target terminals is an electronic device capable of data communication, the entity authentication information includes at least one piece of unique identification information of the device, selected from among a name of the device, a password of the device, a serial number of the device, a kind of the device, a manufacturer of the device, a Media Access Control (MAC) address of the device, a unique Internet Protocol (IP) address of the device, a model and version of the device, a secret key of the device, and authentication information of the device, generated by a private key based on a PKI.

9. The method of claim 6, wherein in steps (b) and (d), the unique authentication token is encrypted and decrypted using a synchronous cryptosystem or an asynchronous cryptosystem.

10. The method of claim 6, wherein in step (f), the digital signature service provision server temporarily stores the generated new hash value in a memory queue, and then reads the new hash value, temporarily stored in the memory queue, at predetermined time intervals, to be used for construction of the hash tree.

* * * * *